United States Patent
Besling et al.

(10) Patent No.: US 10,444,103 B2
(45) Date of Patent: Oct. 15, 2019

(54) METHOD AND APPARATUS FOR CALIBRATING PRESSURE SENSOR INTEGRATED CIRCUIT DEVICES

(71) Applicant: ams International AG, Rapperswil-Jona (CH)

(72) Inventors: Willem Frederik Adrianus Besling, Eindhoven (NL); Casper van der Avoort, Waalre (NL); Remco Henricus Wilhelmus Pijnenburg, Hoogeloon (NL); Martijn Goossens, Veldhoven (NL)

(73) Assignee: ams International AG, Rapperswil (CH)

( * ) Notice: Subject to any disclaimer, the term of this patent is extended or adjusted under 35 U.S.C. 154(b) by 636 days.

(21) Appl. No.: 14/538,397

(22) Filed: Nov. 11, 2014

(65) Prior Publication Data
US 2016/0131550 A1    May 12, 2016

(51) Int. Cl.
*G01L 27/00* (2006.01)
*G01L 9/12* (2006.01)
*G01L 9/00* (2006.01)

(52) U.S. Cl.
CPC .......... *G01L 27/002* (2013.01); *G01L 9/0072* (2013.01); *G01L 9/12* (2013.01)

(58) Field of Classification Search
CPC ....... G01L 27/002; G01L 9/0072; G01L 9/12; G01L 9/00; H01L 29/84; H01L 21/28
USPC ....... 702/98, 50; 257/415, 295, 427; 438/53, 438/4, 51; 73/724
See application file for complete search history.

(56) References Cited

U.S. PATENT DOCUMENTS

| | | | | |
|---|---|---|---|---|
| 4,876,892 A | * | 10/1989 | Arabia | G01L 9/125 331/65 |
| 6,085,894 A | * | 7/2000 | Bedford | B65G 13/12 198/738 |
| 6,378,378 B1 | * | 4/2002 | Fisher | C23C 16/45557 73/754 |

(Continued)

FOREIGN PATENT DOCUMENTS

| | | |
|---|---|---|
| EP | 2700928 A2 | 2/2014 |
| EP | 2711677 A1 | 3/2014 |
| WO | 2008149298 A1 | 12/2008 |

OTHER PUBLICATIONS

Weisstein, Eric W. "Thiele's Interpolation Formula." From MathWorld—A Wolfram Web Resource, http://mathworld.wolfram.com/ThielesInterpolationFormula.html; last visited Dec. 12, 2013.

(Continued)

*Primary Examiner* — Dzung Tran
(74) *Attorney, Agent, or Firm* — Fish & Richardson P.C.

(57) ABSTRACT

In an embodiment, a method for calibrating a pressure sensor device is disclosed. The method involves determining the resonant frequency of a membrane of the pressure sensor device after the pressure sensor device has been attached to a circuit board, calculating a change in the resonant frequency from a resonant frequency stored in memory, calculating strain of the membrane of the pressure sensor device from the change in resonant frequency, and calibrating the pressure sensor device based on a capacitance-to-pressure curve calculated using the strain of the membrane of the pressure sensor device.

7 Claims, 7 Drawing Sheets

(56) References Cited

U.S. PATENT DOCUMENTS

| | | | |
|---|---|---|---|
| 8,256,298 B2 | 9/2012 | Suijlen et al. | |
| 2003/0157875 A1* | 8/2003 | Horner | B64D 13/02 |
| | | | 454/74 |
| 2007/0290763 A1* | 12/2007 | Partridge | G01K 7/32 |
| | | | 331/154 |
| 2012/0167659 A1* | 7/2012 | Besling | H01H 35/346 |
| | | | 73/1.57 |
| 2013/0036827 A1 | 2/2013 | Besling | |
| 2013/0056840 A1 | 3/2013 | Bominaar-Silkens et al. | |
| 2013/0118265 A1 | 5/2013 | Besling et al. | |
| 2013/0122332 A1 | 5/2013 | van Lammeren et al. | |
| 2013/0233086 A1 | 9/2013 | Besling et al. | |
| 2013/0285173 A1 | 10/2013 | Reimann et al. | |
| 2013/0316830 A1 | 11/2013 | Sedzin et al. | |
| 2013/0328142 A1 | 12/2013 | Nackaerts et al. | |
| 2013/0336095 A1* | 12/2013 | Seppa | G01L 9/0016 |
| | | | 367/137 |
| 2014/0053651 A1* | 2/2014 | Besling | G01L 9/0042 |
| | | | 73/702 |
| 2014/0070337 A1 | 3/2014 | Besling et al. | |
| 2014/0253219 A1 | 9/2014 | Caffee et al. | |
| 2014/0260647 A1 | 9/2014 | Shaeffer et al. | |

OTHER PUBLICATIONS

Murata Data Sheet, "Capacitive Absolute 1.2 Bar SCB10H-B012FB Pressure Sensor Element"; Doc. 82 1251 00 C; pp. 1-5; http://www.murata.com/~/media/webrenewal/products/sensor/gyro/element/pressure/datasheet_scb10h_.ashx?la=en; last visited Dec. 12, 2013.

\* cited by examiner

|  | | SQUARE | | | CIRCULAR | |
|---|---|---|---|---|---|---|
|  | WSiN | SiGe | Ref. | WSiN | SiGe | Ref. |
| $\omega_0$ $C_A$ | 15.50 | 15.31 | 13.9 | 4.51 | 4.43 | 4 |
| $C_B$ | 796.3 | 788.1 | 752.4 | 64.0 | 63.8 | 64 |
| $C_C$ | 434.6 | 413.5 | 442.8 | 36.0 | 35.9 | 29.3 |
| $C_D$ | -1.31E-05 | 2.86E-05 |  | -1.09E-05 | 3.41E-05 |  |
| $\bar{\omega}$ $C_E$ | 38.85 | 44.31 |  | 10.77 | 11.91 |  |
| $C_F$ | 2875 | 2559 |  | 209.6 | 191.2 |  |
| $C_G$ | 7851 | 12322 |  | 538.5 | 866.5 |  |
| $C_H$ | -1.16E-04 | -7.45E-05 |  | -1.02E-04 | 6.64E-05 |  |

FIG. 7

METHOD AND APPARATUS FOR CALIBRATING PRESSURE SENSOR INTEGRATED CIRCUIT DEVICES

Analog pressure sensor integrated circuit (IC) devices have a wide variety of applications that include, for example, measuring the pressure of a liquid or gas in a container, measuring the combustion pressure in an engine cylinder, or detecting user-inputs on electronic devices. Depending on the application of the pressure sensor IC device, one of many different types can be used. Typically, pressure sensor IC devices include a piezoresistive material and a diaphragm, such as a film or membrane, to detect strain due to applied pressure. For example, a common type of pressure sensor IC device uses a piezoresistive read-out, which employs the piezoresistive effect to detect strain on the sensor. Another type of pressure sensor IC device uses a capacitive read-out, which employs a pressure sensitive membrane and a pressure cavity to create a capacitor, whose capacitance changes as pressure is applied.

Pressure sensor IC devices that use a capacitive read-out (capacitive pressure sensors) have lower power consumption and greater sensitivity than pressure sensors that use a piezoresistive read-out (piezoresistive pressure sensors.) Additionally, the pressure sensitive membrane of a capacitive pressure sensor can be built directly on top of an integrated read-out circuit allowing a smaller sensor with reduced parasitic capacitance. The smaller sensor also has a better signal to noise ratio and a smaller form factor than a piezoresistive pressure sensor.

Typically, capacitive pressure sensors are calibrated in a factory during manufacture. However, when a pressure sensor IC device is attached to a circuit board, the pressure sensor IC device may experience more strain caused by, for example, solder balls and thermal expansion mismatch, which can decrease performance. In order to accommodate for the additional strain, a capacitive pressure sensor IC device may need to be recalibrated after it has been attached to a circuit board. Typically, recalibrating a capacitive pressure sensor IC device requires a full calibration over several calibration points at many different pressures, which can be a costly process. Thus, there is a need for a way to recalibrate a capacitive pressure sensor IC device after the capacitive pressure sensor IC device has been attached to a circuit board without requiring a full calibration over several calibration points at many different pressures.

In an embodiment, a method for calibrating a pressure sensor device is disclosed. The method involves determining the resonant frequency of a membrane of the pressure sensor device after the pressure sensor device has been attached to a circuit board, calculating a change in the resonant frequency from a resonant frequency stored in memory, calculating strain of the membrane of the pressure sensor device from the change in resonant frequency, and calibrating the pressure sensor device based on a capacitance-to-pressure curve calculated using the strain of the membrane of the pressure sensor device.

In a second embodiment, a pressure sensor device comprising electronic elements is disclosed. The electronic elements are configured to determine the resonant frequency of a membrane of the pressure sensor device after the pressure sensor device has been attached to a circuit board, calculate a change in resonant frequency between the determined resonant frequency and a resonant frequency stored in memory, calculate strain of the membrane of the pressure sensor device from the change in resonant frequency; and calibrate the pressure sensor device based on a capacitance-to-pressure dependency calculated using the strain of the membrane of the pressure sensor device.

In a third embodiment, pressure sensor device is disclosed. The pressure sensor device includes a capacitive pressure transducer, an oscillator circuit coupled to the capacitive pressure transducer, a capacitance-to-digital converter coupled to the capacitive pressure transducer, a communication bus coupled to the oscillator circuit and to the capacitance-to-digital converter, memory coupled to the communication bus, a microcontroller coupled to the communication bus, and an input-output interface coupled to the communication bus, wherein the pressure sensor device is configured to determine, by the oscillator circuit, the resonant frequency of a membrane of the pressure sensor device after the pressure sensor device has been attached to a circuit board, calculate, by the microcontroller, a change in resonant frequency between the determined resonant frequency and a resonant frequency stored in the memory, calculate, by the micro controller, strain of the membrane of the pressure sensor device from the change in resonant frequency, and calibrate, by the oscillator circuit, the pressure sensor device based on a capacitance-to-pressure dependency calculated using the strain of the membrane of the pressure sensor device.

Other aspects and advantages of embodiments of the present invention will become apparent from the following detailed description, taken in conjunction with the accompanying drawings, illustrated by way of example of the principles of the invention.

FIG. 7 is a table of calculated values for use in calibrating a pressure sensor IC device.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
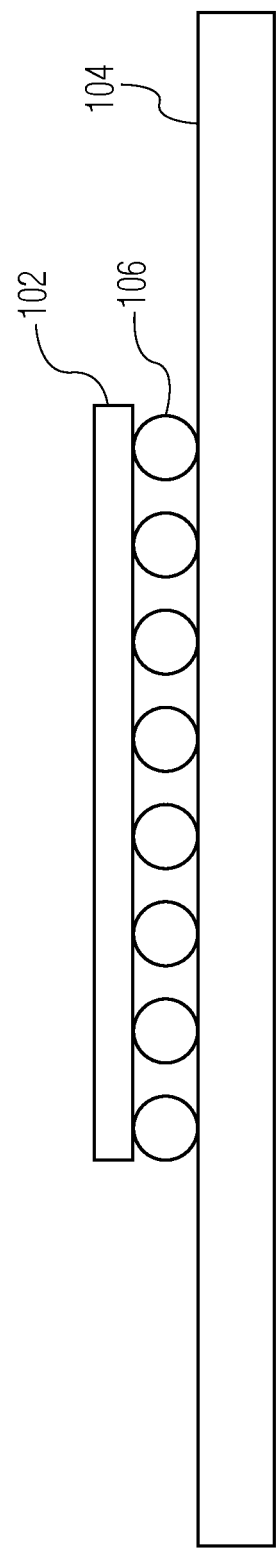
FIG. 1 depicts a pressure sensor IC device attached to a circuit board.

Turning now to FIG. 1, a pressure sensor integrated circuit (IC) device 102 attached to a circuit board 104 is depicted. In the embodiment of FIG. 1, the circuit board is a printed circuit board (PCB) and the pressure sensor IC device is soldered to the PCB using solder balls 106. In another embodiment, the pressure sensor IC device can be attached to a PCB or similar structure by other techniques such as directly soldering the pressure sensor IC device to pads on the circuit board. When the pressure sensor IC device is attached to the PCB, mechanical strain may be imposed on the pressure senor IC device by, for example, the solder balls or by thermal expansion mismatch between the pressure sensor IC device and the PCB. The mechanical strain can cause the pressure sensor IC device to produce inaccurate data.

Figure 2:
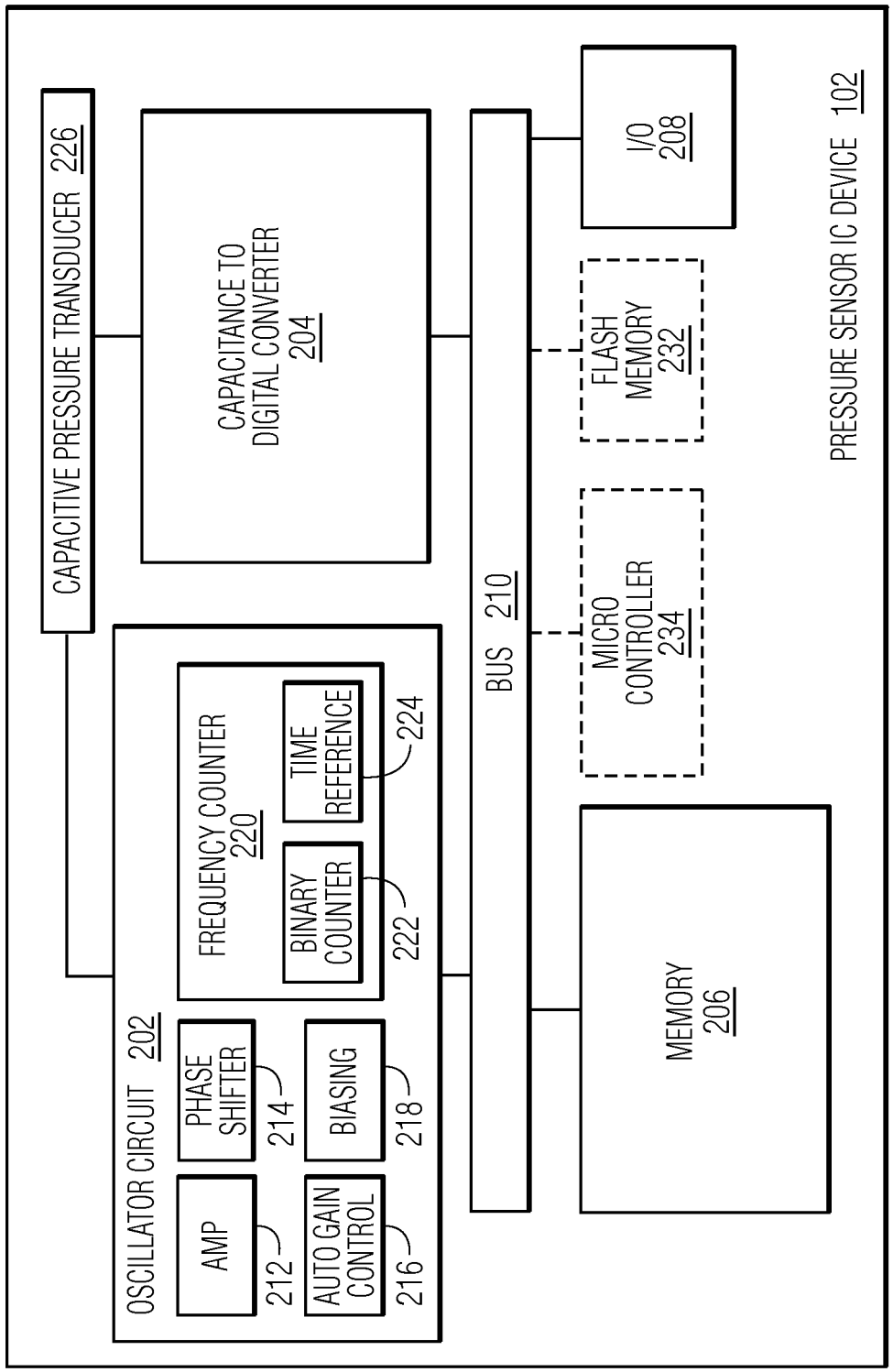
FIG. 2 is a functional block diagram of a pressure sensor IC device in accordance with an embodiment of the invention.

FIG. 2 is a functional block diagram of the pressure sensor IC device 102 in accordance with an embodiment of the invention. In the embodiment of FIG. 2, the pressure sensor IC device includes a capacitive pressure transducer 226 and electronic elements, such as, an oscillator circuit 202, a capacitance to digital converter 204, memory 206, and an input-output interface 208 interconnected by a communication bus 210. In an embodiment, the pressure sensor IC device can further include flash memory 232 and a micro controller 234. The oscillator circuit includes an amplifier 212, a phase shifter 214, an automatic gain controller 216, a biasing controller 218, and a frequency counter 220, the frequency counter including a binary counter 222 and a time reference 234 (e.g., an external clock signal.) In a further embodiment, the pressure sensor IC device can have multiple redundant capacitive pressure transducers.

Figure 3:
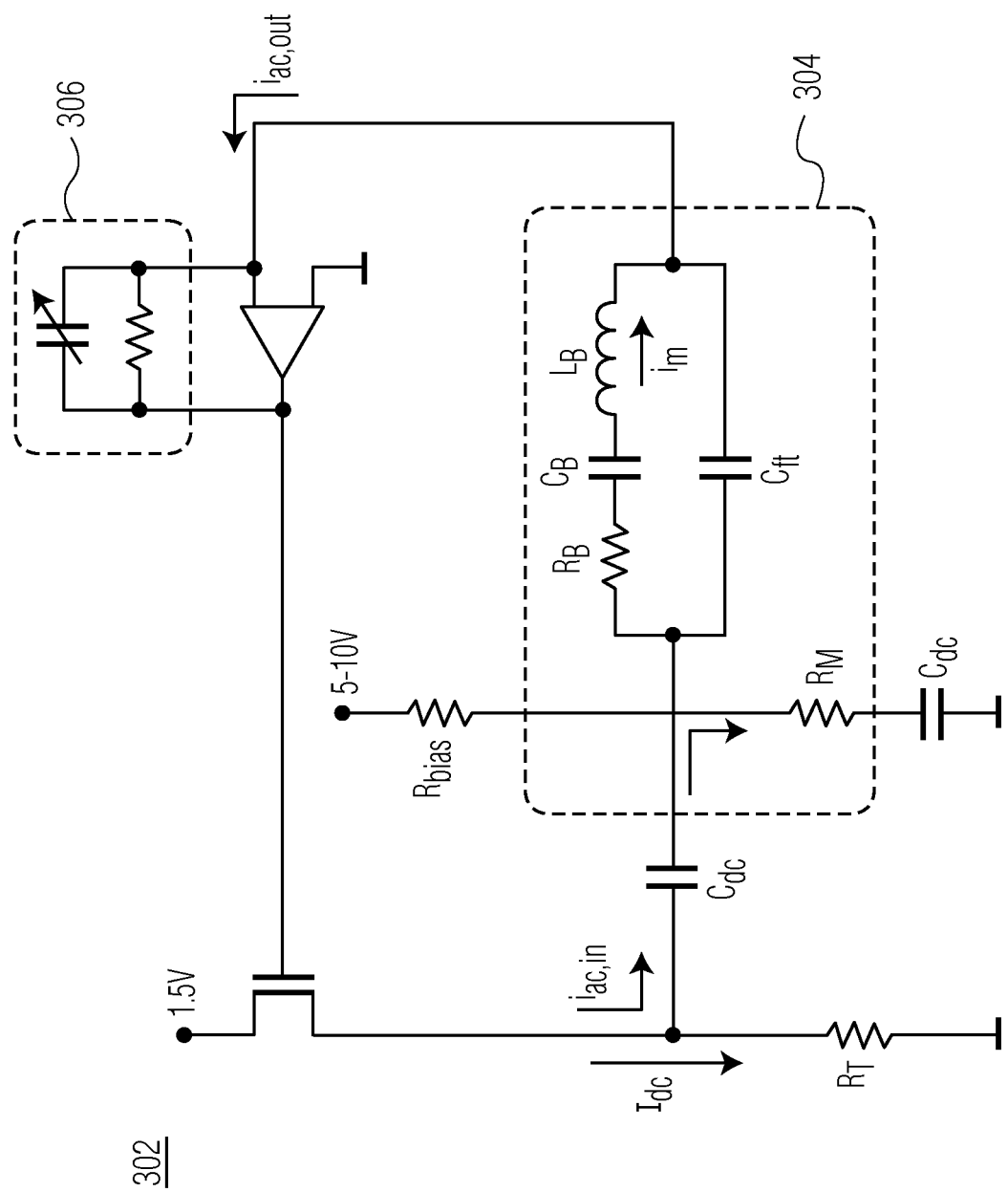
FIG. 3 depicts an embodiment of an oscillator circuit.

FIG. 3 depicts an embodiment of the oscillator circuit 302, such as the oscillator circuit 202 described with reference to FIG. 2, fabricated using known semiconductor processing techniques. In the embodiment of FIG. 3, the oscillator circuit includes a harmonic oscillator 304 and a trimable gain and phase loop 306. The harmonic oscillator can be modified to manipulate the frequency of a membrane of the capacitive pressure transducer to bring the membrane into resonance.

Figure 4:
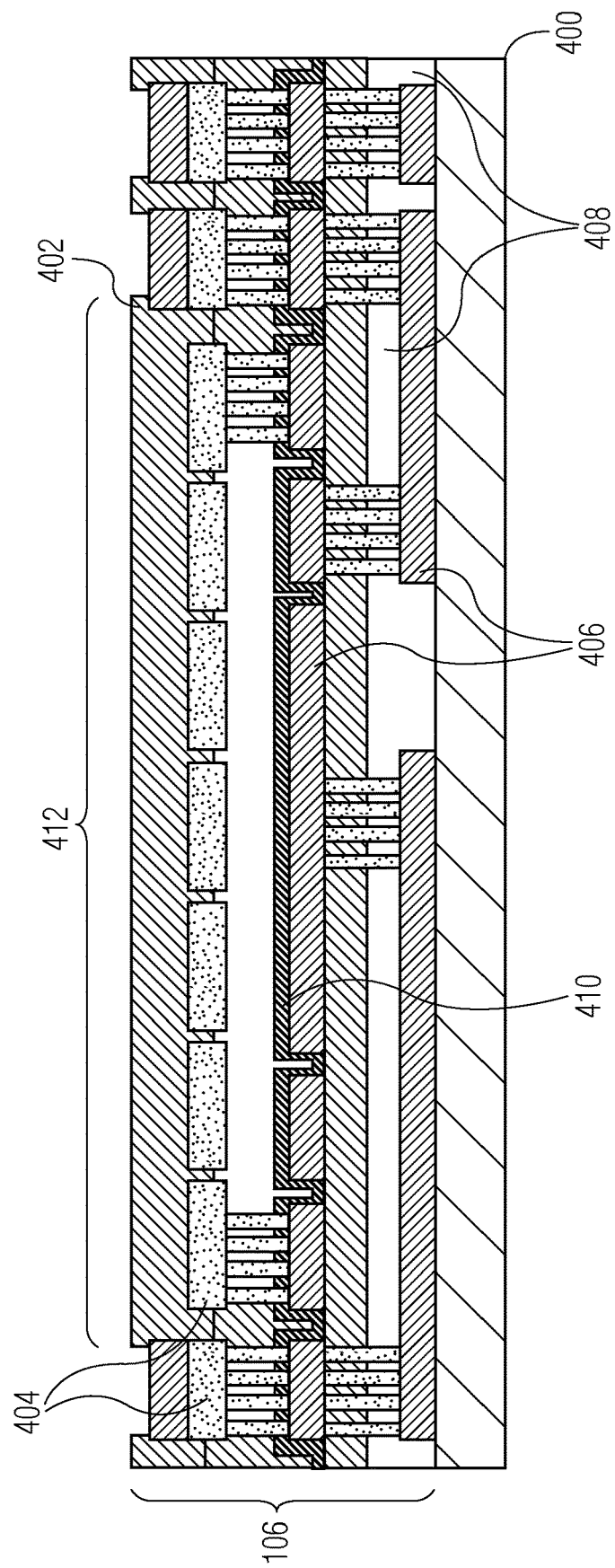
FIG. 4 depicts a capacitive pressure transducer that is fabricated on top of a semiconductor substrate in accordance with an embodiment of the invention.

FIG. 4 depicts a capacitive pressure transducer that is fabricated on top of a semiconductor substrate 400 in accordance with an embodiment of the invention. In an embodiment, the electronic elements of FIG. 2 are fabricated into the semiconductor substrate. The capacitive pressure transducer includes a passivation and sealing layer 402, a top metal electrode 404, a bottom metal electrode 406, an interconnect dielectric layer 408, and an etch stop layer 410. In an embodiment, the capacitive pressure transducer is fabricated by depositing a sacrificial layer and the top electrode over the bottom metal electrode and the etch stop layer. The sacrificial layer is then removed through tiny holes in the top metal electrode using a dry etch method so that the top metal electrode remains as a membrane 412 over the bottom metal electrode. Once the sacrificial layer has been removed, the passivation and sealing layer is deposited over the top metal electrode sealing the top metal electrode. In an embodiment, the sealing layer is made of a silicon dioxide or silicon nitride compound or a combination thereof. Other techniques can be used to fabricate the capacitive pressure transducer. In another embodiment, a piezoelectric material, such as AlN, can be deposited on top of the sealing layer for use with piezoelectric actuation.

Typically, when a pressure sensor IC device is attached to a PCB, the pressure sensor IC device may experience mechanical strain—particularly on the membrane of the capacitive pressure transducer. The mechanical strain can cause the configuration of the pressure sensor IC device to produce inaccurate data, but the configuration can be adapted to the imposed mechanical strain by recalibrating the pressure sensor IC device. Traditionally, in order to calibrate and/or recalibrate the pressure sensor IC device, several capacitance-pressure calibration points are generated by applying reference pressures (typically more than four) to the capacitive pressure transducer and measuring the capacitance when each pressure is applied. A capacitance-to-pressure curve is then generated by a polynomial fit over the capacitance-pressure calibration points. Because a capacitance-to-pressure curve is a non-linear curve, several reference pressures are needed in order to generate an accurate curve for calibrating and/or recalibrating the pressure sensor IC device. Thus, the more reference pressures measured, the greater the accuracy of the calibration and/or recalibration of the pressure sensor IC device, but the more costly the pressure sensor IC device is to recalibrate since time and effort is required to calculate each calibration point. As a result, pressure sensor IC devices could suffer from reduced accuracy because recalibrating pressure sensor IC devices after they are attached to PCBs is too costly and, thus, impractical.

In accordance with an embodiment of the invention, a pressure sensor IC device can be calibrated after the pressure sensor IC device has been attached to a PCB by determining the resonant frequency of a membrane of the capacitive pressure transducer after the pressure sensor IC device has been attached to a circuit board, calculating a change in the resonant frequency between the determined resonant frequency and the resonant frequency of the membrane of the pressure sensor IC device stored in memory, calculating strain of the membrane of the pressure sensor IC device from the change in resonant frequency, and calibrating the pressure sensor IC device based on a capacitance-to-pressure dependency calculated using the strain of the membrane of the pressure sensor IC device. In a further embodiment, calibration points are measured and membrane stress, gap height, and capacitance offset are determined using a physical model that describes the capacitance-to-pressure behavior based on the calibration points. In an embodiment, the capacitance-to-pressure curve is generated using the Thiele Continued Fraction Interpolation Formula over the calibration points. The pressure sensor IC device is calibrated using the generated capacitance-to-pressure curve. Bringing a capacitive pressure transducer into resonance, deriving calibration points without testing reference pressures, and interpolating the capacitance-to-pressure dependency for all pressure values in a capacitance-to-pressure curve requires considerably less time than a standard calibration process. Because the technique takes less time, recalibration after a pressure sensor IC device has been attached to a circuit board is less costly than a standard calibration process and, thus, practical.

Figure 5:
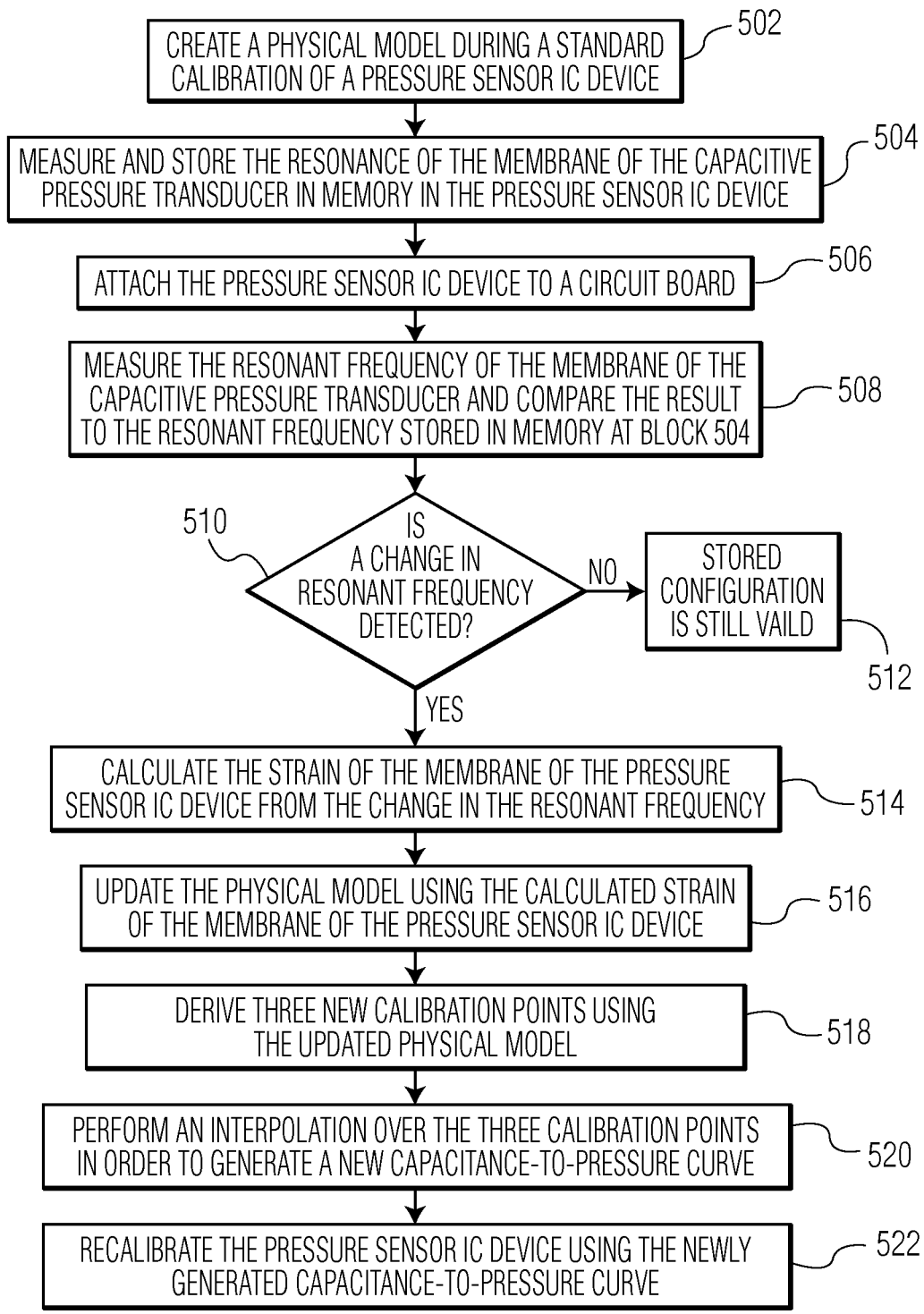
FIG. 5 is a flow chart diagram of an embodiment of a method for recalibrating a pressure sensor IC device in accordance with an embodiment of the invention.

FIG. 5 is a flow chart diagram of a method for recalibrating a pressure sensor IC device in accordance with an embodiment of the invention. At block 502, during a standard calibration of a pressure sensor IC device, a physical model is created. In an embodiment, the physical model is created from several capacitance-pressure calibration points generated by applying reference pressures (typically three) to the membrane of the pressure sensor IC device and measuring the capacitance when each pressure is applied. At block 504, the resonant frequency of the membrane of the pressure sensor IC device is measured and stored in memory in the pressure sensor IC device (e.g., the memory 206 in the ASIC of FIG. 2.) In an embodiment, the resonant frequency can be determined by fitting a LCR (inductor, capacitor, and resistor) model to impedance data generated by sweeping the frequency and detecting a peak in the sweep. In another embodiment, the resonant frequency can be determined using known piezoelectric methods. At block 506, the pressure sensor IC device is attached to a circuit board and, at block 508, the resonant frequency of the membrane of the pressure sensor IC device is measured again and compared to the resonant frequency stored in the memory at block 504. At decision point 510, it is determined if a change in resonant frequency is detected by the comparison performed at block 508. At block 512, if no change in resonant frequency is detected, then the configuration stored in memory is used and the pressure sensor IC device is not recalibrated. Alternatively, at block 514, if a change in resonant frequency is detected, then strain of the membrane of the pressure sensor IC device is calculated from the change in the resonant frequency and, at block 516, the physical model is updated using the calculated strain of the membrane of the pressure sensor IC device. In an embodiment, the calculated strain corresponds to the strain of a membrane (e.g., 412 in FIG. 4) and the physical model is updated using the strain of the membrane. At block 518, three new calibration points are then derived using the physical model and, at block 520, an interpolation is performed over the three calibration points in order to generate a new capacitance-to-pressure curve. Finally, at block 522, the pressure sensor IC device is recalibrated using the newly generated capacitance-to-pressure curve.

In an embodiment, the physical model only needs three parameters (i.e., gap height, effective membrane stress/strain, and parasitic capacitance) to calculate membrane deflection and capacitance as a function of pressure. Using the three parameters, membrane deflection and capacitance can be calculated as a function of pressure for a circular membrane by the following equation:

$$C(P) = \int_0^R \frac{\varepsilon_0 \varepsilon_r}{\varepsilon_r(g - w(r, P)) + h_{dielectric}} 2\pi r \, dr \quad (1)$$

and for a square membrane by the following equation:

$$C(P) = \varepsilon_0 \int\int_A \frac{1}{g - w(x, y, P) + \frac{h_{dielectric}}{\varepsilon_r}} dx \, dy \quad (2)$$

where $\varepsilon_0$ and $\varepsilon_r$ are the permittivity of the bottom and top electrodes respectively, g is gap height, and $h_{dielectric}$ is the electrode isolation thickness. The deflection of a membrane as a function of pressure (i.e., $w_O$) is given by:

$$w_o = \frac{\frac{2}{3}^{\frac{1}{3}} C_B D_{eff} d_{tot}^2}{\Psi} - \frac{\Psi}{2^{\frac{1}{3}} 3^{\frac{2}{3}} C_C D_{eff}} + \frac{\frac{2}{3}^{\frac{1}{3}} a^4 C_D d_{tot} \sigma_{eff}}{\Psi} + \frac{\frac{2}{3}^{\frac{1}{3}} a^2 C_A d_{tot}^3 \sigma_{eff}}{\Psi} \quad (3)$$

and $$\Psi = \left[ \sqrt{3} \sqrt{C_C^3 D_{eff}^3 d_{tot}^3 \begin{pmatrix} 27 a^8 C_C D_{eff} d_{tot} p^2 + \\ 4(C_B D_{eff} d_{tot} + a^4 C_D \sigma_{eff} + a^2 C_A d_{tot}^2 \sigma_{eff})^3 \end{pmatrix}} + \begin{matrix} -9 a^4 C_C^2 D_{eff}^2 d_{tot}^2 p + \end{matrix} \right]^{\frac{1}{3}}$$

where $D_{eff}$ is the effective flexural rigidity of the membrane, a is the diameter of the membrane, $d_{tot}$ is the total thickness of the membrane, t is the thickness of the individual layers in the membrane, $\sigma_{eff}$ is the effective stress of the membrane, and $C_A$-$C_D$ are constants according to the table in FIG. 7. Therefore, because all other variables are constant or known, the effective stress of the membrane is the only variable that must be determined in order to calculate membrane deflection and capacitance as a function of pressure.

The change in the effective stress of a membrane after integration can be calculated from the resonant frequency of the capacitive pressure transducer using the following equation:

$$\Delta f_{res} = \frac{1}{2\pi} \left( \sqrt{\frac{\left(C_A d_{tot} + \frac{C_D a^2}{d_{tot}}\right) * \sigma_{eff,2}}{m_{eff}}} - \sqrt{\frac{\left(C_A d_{tot} + \frac{C_D a^2}{d_{tot}}\right) * \sigma_{eff,1}}{m_{eff}}} \right) \quad (4)$$

where $m_{eff}$ is the effective mass of the membrane. Thus, by determining the change in effective stress of the membrane from the resonant frequency and using the equations above, membrane deflection and capacitance can be calculated as a function of pressure.

In an embodiment, by using electrostatic actuation, the resonant frequency of a membrane in a pressure sensor is determined by an oscillator circuit detecting frequency shifts as small as 10 Hz or lower. In accordance with an embodiment of the invention, if a shift in resonant frequency is detected, then the physical model is updated and three new calibration points can be derived and used as input parameters for the Thiele interpolation. The Thiele interpolation is a mathematical interpolation formula for a function f(x) of a single variable and is expressed as a continued fraction, where ρ represents the reciprocal difference, as:

$$f(x) = \qquad (7)$$
$$f(x_1) + \cfrac{x-x_1}{\rho(x_1,x_2) + \cfrac{x-x_2}{\rho_2(x_1,x_2,x_3) - f(x_1) + \cfrac{x-x_3}{\rho_3(x_1,x_2,x_3,x_4) - \rho(x_1,x_2) + \ldots}}}$$

Here $\rho_n(x_0, x_1, x_2, \ldots, x_n)$ are the reciprocal differences given by:

$$\rho_1(x_0, x_1) = \frac{x_0 - x_1}{f(x_0) - f(x_1)}$$

$$\rho_2(x_0, x_1, x_2) = \frac{x_0 - x_2}{\rho_1(x_0, x_1) - \rho_1(x_1, x_2)} + f(x_1)$$

$$\rho_n(x_0, x_1, \ldots, x_n) =$$
$$\frac{x_0 - x_n}{\rho_{n-1}(x_0, x_1, \ldots, x_{n-1}) - \rho_{n-1}(x_1, x_2, \ldots, x_n)} + \rho_{n-2}(x_1, \ldots, x_{n-1})$$

The Thiele continued fraction interpolation formula can be rewritten into a Capacitance-Pressure function for interpolation ($c_i, p_i$) points. In an embodiment, at least three interpolation points are required for a Thiele interpolation. In a further embodiment, these points are not allowed to be equally spaced. If a Thiele interpolation is performed for three interpolation points, then the following C(P) relation can be found:

Capacitance(P)=−[{(−p1*p3+p2*p3+P*p1−P*p2)
*c2+(−P*p1+P*p3+p1*p2−p2*p3)*c3}*c1+(−
p1*p2+p1*p3+P*p2−P*p3)*c3*c2]/[(−p1*p2+
p1*p3+P*p2−P*p3)*c1+(−P*p1+P*p3+p1*p2−
p2*p3)*c2+(−p1*p3+p2*p3+P*p1−P*p2)*c3]

where p1, p2, and p3 are the pressure values for each interpolation point and c1, c2, and c3 are the corresponding capacitance values for each interpolation point. The formula can be rewritten into a P(C) relation to get a pressure value out of a single capacitance measurement using only three calibration points as follows:

Pressure(C)=[c1*p1*p3*c2−p2*p3*c1*c2−
c1*p2*p1*c3+p2*p3*c1*c3+p1*c2*p2*c3−
p1*p3*c2*c3+C*c1*p1*p2−C*p1*p3*c1−
C*p2*p1*c2+C*p2*p3*c2+C*p1*p3*c3−
C*p3*c3*p2]/[−c1*c2*p2+c1*p1*c2−
c1*p1*c3+c1*c3*p3+c3*c2*p2−c3*c2*p3+
C*c1*p2−C*c1*p3−C*c2*p1+C*c2*p3−
C*c3*p2+C*c3*p1]

Figure 6:
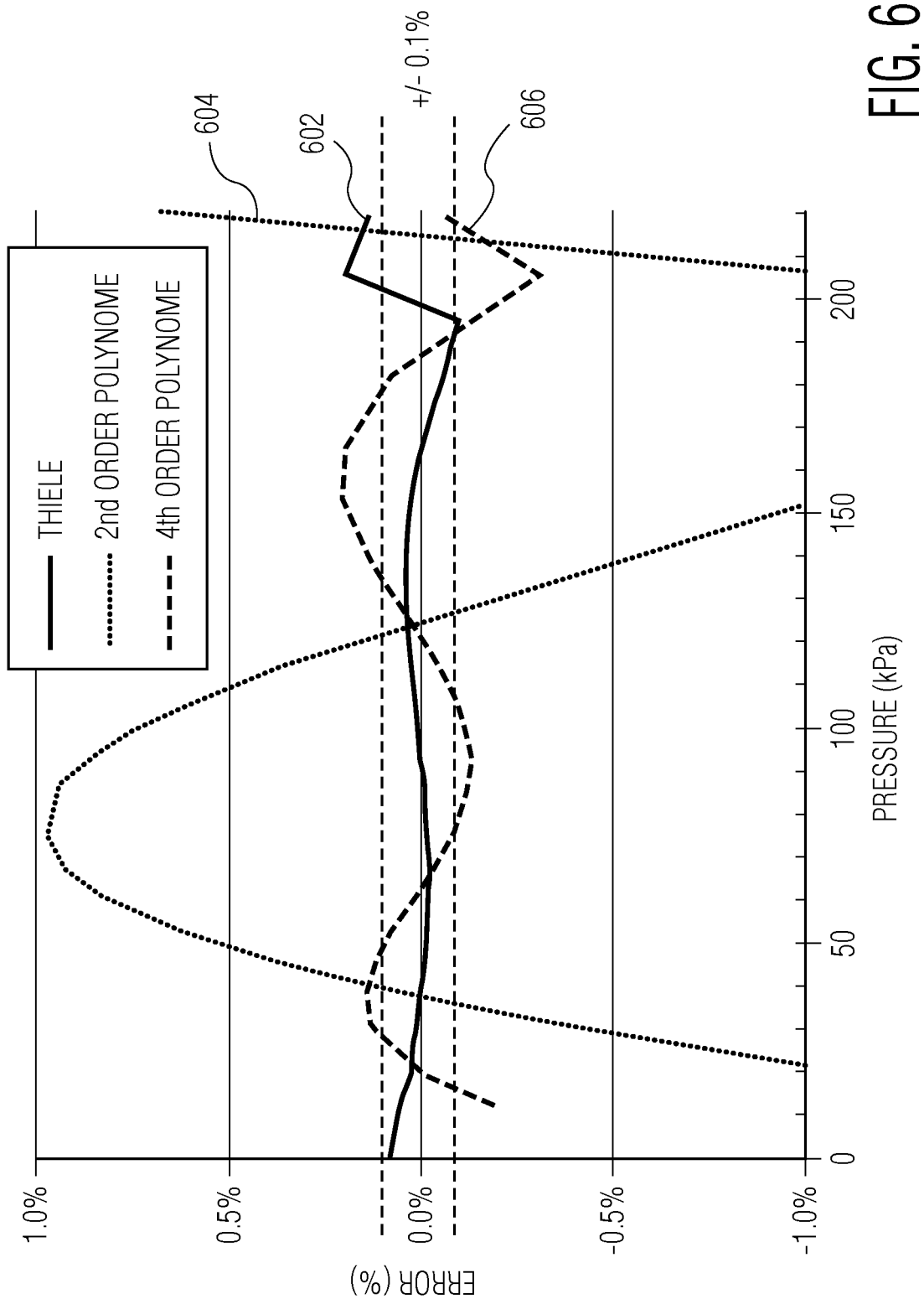
FIG. 6 is a graph comparing the relative error between measurement data and a C(P) curve from a Thiele interpolation, a second order polynomial interpolation, and a fourth order polynomial interpolation.

Either function is a highly accurate interpolation of the pressure-to-capacitance relation. For example, as shown in FIG. 6, a C(P) curve from a Thiele interpolation has very little error. FIG. 6 is a graph comparing the relative error between measurement data and a C(P) curve from a Thiele interpolation 602, a second order polynomial interpolation 604, and a fourth order polynomial interpolation 606 using three interpolation points. The Thiele interpolation produces less than 0.1% error across the interpolation while both the $2^{nd}$ order polynomial interpolation and the $4^{th}$ order polynomial interpolation produce much greater error across the interpolation.

In addition to recalibrating a pressure sensor IC device after it has been attached to a PCB, in an embodiment, a pressure sensor IC device can also be recalibrated after a period of time to, for example, correct for outgassing, which may result in a change in cavity pressure.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A pressure sensor device comprising:
   a capacitive pressure transducer; and
   electronic elements comprising:
      an oscillator circuit coupled to the capacitive pressure transducer;
      a capacitance-to-digital converter coupled to the capacitive pressure transducer the oscillator circuit comprising a harmonic oscillator;
      a communication bus coupled to the oscillator circuit and to the capacitance-to-digital converter;
      memory coupled to the communication bus;

a microcontroller coupled to the communication bus; and an input-output interface coupled to the communication bus, wherein the microcontroller is operable to:

store, using the memory, a resonant frequency of a membrane of the pressure sensor device before the pressure sensor device has been attached to a circuit board, manipulate, using the harmonic oscillator, a frequency of the membrane of the capacitive pressure transducer to bring the membrane into resonance;

determine the resonant frequency of the membrane of the pressure sensor device after the pressure sensor device has been attached to a circuit board;

calculate a change in resonant frequency between the determined resonant frequency and the resonant frequency stored in the memory;

calculate strain of the membrane of the pressure sensor device from the change in resonant frequency;

calibrate, using the oscillator circuit, the pressure sensor device based on a capacitance-to-pressure dependency calculated using the strain of the membrane of the pressure sensor device;

calculate capacitance-to-pressure calibration points using the capacitance-to-pressure dependency;

calculate a capacitance-to-pressure curve by interpolation over the capacitance-to-pressure calibration points; and calibrate, using the oscillator circuit, the pressure sensor device based on the capacitance-to-pressure curve calculated.

2. The pressure sensor device of claim 1, wherein the microcontroller is operable to interpolate the capacitance-to-pressure curve using a Thiele Continued Fraction Interpolation over three capacitance-to-pressure calibration points.

3. The pressure sensor device of claim 1, wherein the microcontroller is operable to interpolate the capacitance-to-pressure curve using a Thiele Continued Fraction Interpolation over four capacitance-to-pressure calibration points.

4. The pressure sensor device of claim 1, wherein the pressure sensor device further comprises an oscillator circuit operable to determine the resonant frequency of the pressure sensor device after the pressure sensor device has been attached to a circuit board.

5. The pressure sensor device of claim 4, wherein the oscillator circuit is operable to determine the resonant frequency of the pressure sensor device after the pressure sensor device has been attached to the circuit board using at least one of electrostatic actuation and piezoelectric actuation.

6. The pressure sensor device of claim 1, wherein the microcontroller is operable to determine the capacitance-to-pressure dependence using membrane stress, gap height and parasitic capacitance as determined from a physical model based on at least three capacitance-to-pressure calibration points.

7. The pressure sensor device of claim 1 comprising:

a semiconductor substrate including the electronic elements, wherein the capacitive pressure transducer is on top of the semiconductor substrate, and wherein the electronic elements are embedded in the semiconductor substrate.

* * * * *